G. E. VILLARET.

ELECTRIC LIGHT FIXTURE.

APPLICATION FILED JAN. 10, 1922.

Reissued Sept. 12, 1922. 15,455.

Inventor,

Gustave E. Villaret.

By Gordon & Sterrett

Attorneys.

Reissued Sept. 12, 1922. Re. 15,455

UNITED STATES PATENT OFFICE.

GUSTAVE E. VILLARET, OF NEW YORK, N. Y.

ELECTRIC-LIGHT FIXTURE.

Original No. 1,361,786, dated December 7, 1920, Serial No. 385,528, filed June 1, 1920. Application for reissue filed January 10, 1922. Serial No. 528,335.

*To all whom it may concern:*

Be it known that I, GUSTAVE E. VILLARET, a citizen of the United States, and a resident of the city of New York, borough of the Bronx, in the county of Bronx and State of New York, have invented a new and Improved Electric-Light Fixture, of which the following is a full, clear, and exact description.

This invention relates to improvements in electric light fixtures, an object of the invention being to provide an electric light fixture which will distribute and diffuse the light so as to give the desired illumination in all directions and yet overcome glare.

A further object is to provide a two part electric fixture which is capable of a wide variation in design, ornamentation and coloring to provide fixtures which will be extremely attractive, and which will give the light effects desired at a reasonably low price.

With these and other objects in view the invention consists in certain novel features of construction, and combinations and arrangements of parts as will be more fully hereinafter described and pointed out in the claims.

In the accompanying drawings—

Figure 1:
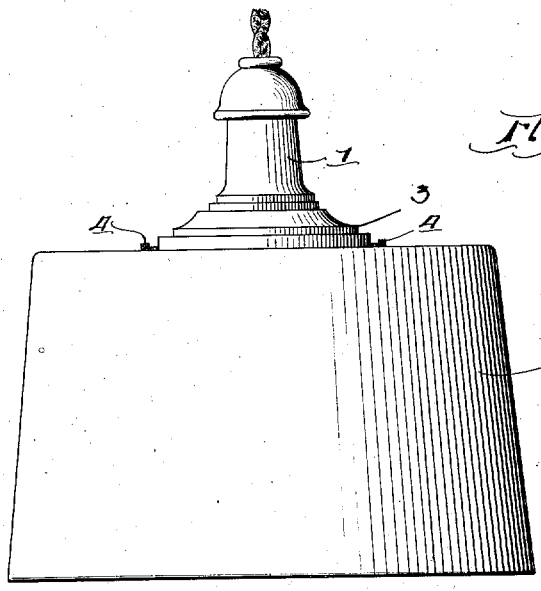
Fig. 1 is a view in side elevation illustrating my improved fixture.

1 represents a lamp socket receiving the ordinary electric light bulb 2 and provided with the ordinary inverted ring 3 with set screws 4 to secure a globe in place. The above described parts are such as are common in the art and my improved fixture is adapted to be connected to such a structure or to any ordinary standard structure in general use.

My improved fixture comprises three parts; namely, a globe 5, a shade 6, and a ring 7 interposed between the globe and the shade. The globe 5 has a transversely extended or bulbous lower portion 8 and an upwardly extending slightly tapering or conical portion 9, the latter made with an annular groove 10 to receive the screws 4 and clamp the globe in the fixture. This lower enlarged or bulbous portion 8 of the globe 5 is preferably frosted or otherwise formed so as to diffuse the rays of light which pass directly downward through the globe, and the upper portion of the bulbous lower end 8 constitutes a supporting shoulder on which the ring 7 is located.

This ring 7 is preferably of metal and is of general angular shape in cross-section and supports thereon an inwardly and downwardly projecting annular portion 11 of the shade 6. This portion 11 is integral with the outer portion of the shade 6 and may be of white glass and constitute a deflecting surface and the outer portion of the shade 6 may extend downwardly below the horizontal plane of the globe 5 so as to form in effect an inclosure therefor.

Figure 2:
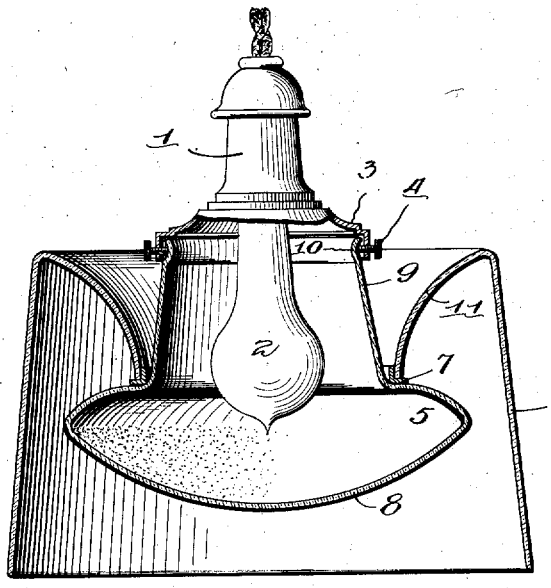
Fig. 2 is a view in vertical section through the center of the fixture.

The portion 11 extends away from the ring 7 in an upward and outward direction in such manner that its intersection with any vertical plane through the axis of the fixture is an arc of a circle. This is best shown in Fig. 2 where this arc is indicated as having the convex side toward the axis of the fixture. This gives a flare to the deflecting surface whereby the light passing through the member 9 and striking any point on the portion 11, is intercepted and disseminated upwardly from the convex side of portion 11.

It will be noted that the shade 6 is supported on the globe 5 with the ring 7 interposed between the shade and the globe, and this ring 7 prevents direct contact of the glass or other materials forming the globe and the shade and prevents cracking or breaking of the glass due to the heat or to variations in the expansions and contractions of the parts.

It is obvious that the precise shapes of the globe and the shade may be varied so that a wide variety of design, ornamentation and coloring can be resorted to without departing from my invention and by providing the parts as above described, globes of one kind can be used with shades of various designs and coloring effects to suit conditions.

In operation, the light from the bulb 2 passes directly through the upper glass portion 9 of the globe 5 and is deflected upwardly by the inwardly tapering portion 11 of the shade 6. The rays of light are diffused through the lower portion of the globe 5 and through the shade so that the rays pass downwardly and outwardly and are preferably diffused so as to soften the light and reduce the glare. This diffusion and coloring effect is, of course, varied by the manner of forming and coloring the parts and I do not wish to be limited in this particular.

It is the essential purpose of my invention to reflect the rays of light striking the portion 11 and to distribute them in the most advantageous manner. This result is accomplished independently of the form or extent of the outer depending skirt. The latter may terminate as a depending flange of limited extent without affecting the above result.

What I claim is:

1. An electric light fixture, comprising a globe having an annular shoulder adjacent its lower end, a removable shade of appreciably greater diameter than the globe, said shade having at its upper end an inwardly and downwardly projecting annular portion spaced from the body of the shade and supported on said shoulder and operating as a deflecting surface to throw a portion of the light from the globe upwardly.

2. An electric light fixture, comprising a globe having an open upper end and throughout its upper portion of general tapering or conical form, said globe having an extended or bulbous portion at its lower end, a shade inclosing the bulbous portion of the globe and having at its upper end a downwardly and inwardly curved annular portion spaced from the body of the shade, and a metal ring interposed between said last-mentioned portion and the bulbous portion of the globe.

3. An electric light fixture, comprising a globe having an annular shoulder adjacent its lower end, a reflector resting upon said shoulder and intercepting the light from said globe, and a depending flange or shade on the outer periphery of the reflector.

In witness whereof I hereunto affix my signature.

GUSTAVE E. VILLARET.